United States Patent
Carscadden

Patent Number: 5,399,967
Date of Patent: Mar. 21, 1995

[54] MOTION TRANSDUCER

[75] Inventor: Ian A. Carscadden, High Heaton, United Kingdom

[73] Assignee: British Gas plc, England

[21] Appl. No.: 31,359

[22] Filed: Mar. 15, 1993

[30] Foreign Application Priority Data

Mar. 13, 1992 [GB] United Kingdom ............... 9205511

[51] Int. Cl.⁶ .......................... G01B 7/02; G01B 7/14; H01L 43/06
[52] U.S. Cl. .......................... 324/207.20; 324/207.24; 324/207.12; 324/235; 338/32 H
[58] Field of Search ............... 324/235, 207.2, 207.11, 324/207.12, 207.24, 207.25, 207.21; 338/32 H, 32 R

[56] References Cited

U.S. PATENT DOCUMENTS

| | | | |
|---|---|---|---|
| 3,205,485 | 9/1965 | Noltingk | 324/207.24 |
| 3,500,091 | 3/1970 | Jones | 324/174 |
| 4,471,304 | 9/1984 | Wolf | 324/251 |
| 4,793,241 | 12/1988 | Mano et al. | 324/207.24 |
| 4,825,157 | 4/1989 | Mikan | 338/32 H |
| 5,191,283 | 3/1993 | Gesenhues | 324/207.24 |

FOREIGN PATENT DOCUMENTS

| | | |
|---|---|---|
| 0244736 | 11/1987 | European Pat. Off. . |
| 1473854 | 2/1969 | Germany . |
| 2945895 | 5/1981 | Germany . |

*Primary Examiner*—Kenneth A. Wieder
*Assistant Examiner*—R. Phillips
*Attorney, Agent, or Firm*—Larson and Taylor

[57] ABSTRACT

A motion transducer for measuring the displacement of, for example, shafts in gas control modules. The shaft 14 carries two magnets 10, 12 each of hollow cylindrical form, the magnet 10 presenting a south pole everywhere over its external cylindrical face and the magnet 12 presenting a north pole everywhere over its external cylindrical face. The shaft 14 moves vertically past an array of Hall-effect sensors 18-24 to produce sinusoidal voltage outputs at the sensors. The outputs are combined in a summing amplifier (FIG. 3). The combined output is not affected by rotation of the shaft and magnets nor by tilting or sideways displacement of the axis 16 of the shaft. That is because no matter what the rotational position is the sensors are always subjected to the same magnetic field and, if the shaft tilts or is displaced sideways an increased field at some sensors is compensated by a decreased field at others.

(FIG. 1 is suggested as the accompanying drawing).

5 Claims, 2 Drawing Sheets

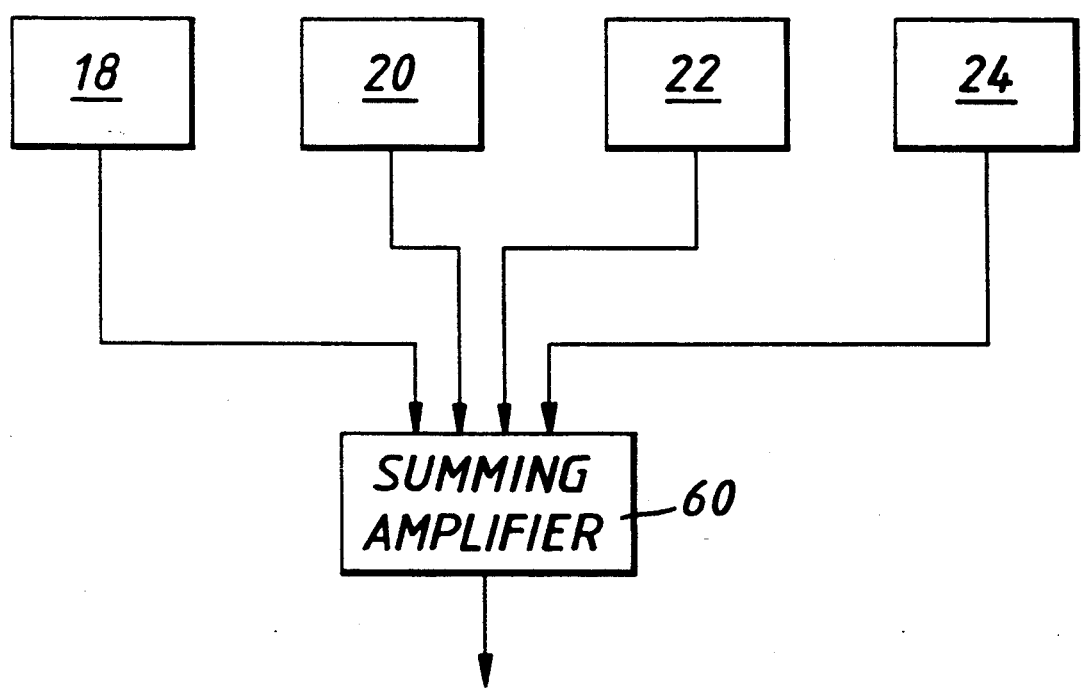

5,399,967

MOTION TRANSDUCER

FIELD OF THE INVENTION

The invention relates to motion transducers.

BACKGROUND OF THE INVENTION

The typical use of a motion transducer is in a gas module of the kind shown in European Patent Application No. 91 306159.4 (Publication No. 0473264). In that application a slam-shut valve is shown which is connected by a cable to a re-set shaft carrying a handle. The transducer finds application in measuring the axial displacement of that handle during closure of the slam-shut valve.

SUMMARY OF THE INVENTION

The object of the invention is to provide a motion transducer having an output which is unaffected by rotation or displacement of the longitudinal axis of such a shaft or equivalent element.

A motion transducer, according to the invention, comprises magnetised ferromagnetic material which is capable of motion past an array of Hall-effect sensors positioned at points on a circle. The motion is along a straight axis transverse to a plane in which said circle lies, said said axis is displaceable from a true position normal to said plane through the centre of said circle to a displacement position within said circle. The magnetised material is in the form of a hollow cylinder having a central longitudinal axis coincident with said straight axis, comprising external and internal faces and said material is magnetised so that said external face everywhere presents a magnetic pole of a first polarity and said internal face everywhere presents a magnetic pole of a second polarity. Each sensor has an output when the magnetised material moves past the sensors and the transducer also comprises means by which said output may be combined with each other said output to yield a combined output representative of said motion. The value of the combined output is not affected by any rotation of said magnetised material about said axis either in said true position or in said displaced position. The sensors are in positions in the array such that said output is equal to each other said output in response to said motion along said axis in said true position and said combined output not being affected by said motion along said axis in said displaced position. Any increase in said output from any sensor or sensors closer to said displaced position of said axis is compensated for by reduced output from a sensor or sensors more remote from said displacement position of said axis.

Preferably, the magnetised material comprises a first piece and a second piece, said first piece comprises a first external face and the first piece being magnetised so that said first external face everywhere presents a magnetised pole of the first polarity, said second piece comprises a second external face and the second piece being magnetised so that said second external face everywhere presents a magnetised pole of a second polarity.

There are preferably four sensors in said array a points on said circle which points are equiangularly distributed around said circle.

BRIEF DESCRIPTION OF THE DRAWINGS

An embodiment of the invention will now be described by way of example with reference to the accompanying drawings, in which:

FIG. 3 is block diagram showing summing of the outputs of the sensors shown in FIGS. 1 and 2.

DESCRIPTION OF THE PREFERRED EMBODIMENTS

Figure 1:
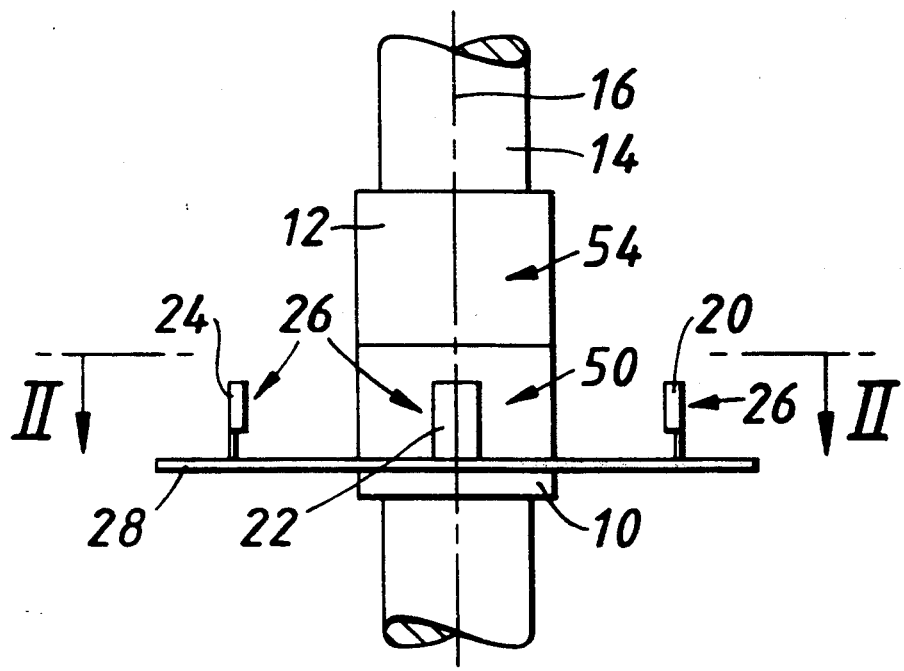
FIG. 1 is a side elevation of a motion transducer.

FIG. 1 shows the main components of the motion transducer which are: a hollow, cylindrical magnet 10 and a similar magnet 12, which are mounted around a shaft 14; the magnets 10, 12 are movable with the shaft 14 along an axis 16; and four Hall-effect sensors 18, 20, 22, 24 arranged as an array 26. The Hall-effect sensors are each available under the type code LOHET II from Honeywell Control Systems Limited, Components Group, Charles Square, Bracknell, Berkshire RG12 1EB.

Figure 2:
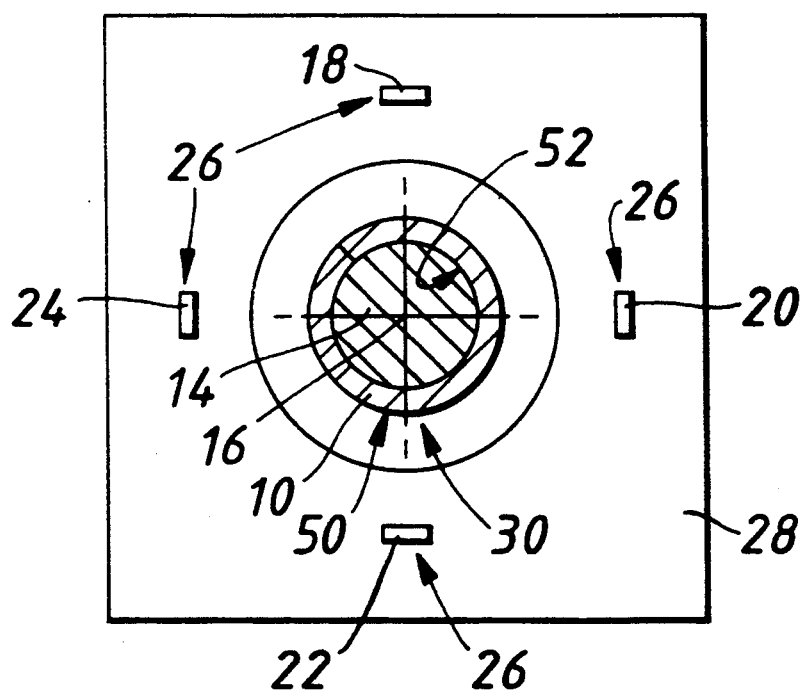
FIG. 2 is a horizontal cross-section on the line II—II in FIG. 1.

The sensors 18–24 are mounted at points at equiangular intervals on a circle having its centre coincident with the axis 16. The sensors 18–24 are mounted on a plate 28 having a circular aperture 30 through which the magnets 10, 12 are movable with clearance. Each sensor 18–24 is arranged with its face lying in a plane which is tangential to the circle at points of which the sensors are located. This arrangement is used whatever the number of sensors in the array may be. The plate 28, in the application of the transducer to a gas module, is mounted outside the pressurised gas space above the bulkhead 14 shown in FIG. 1 of U.K. Patent Publication No. 0473264. The shaft 14 is intended in that application to be the slam-shut valve reset handle. When the slam-shut valve closes, it pulls on the cable by which it is connected to the handle. The slam-shut valve ascends in its closing motion and the motion is transferred through the cable to the handle i.e. to the shaft 14 shown in FIGS. 1 and 2. The resultant downward motion of the shaft 14 is measured by the transducer.

The transducer produces a continuous combined output from which the length of stroke of the shaft 14, its velocity at any point in its motion, and its acceleration at any point can be derived. The transducer can thus detect changes in these parameters, which are typical of malfunction (owing to dirt, for example). In this way the transducer functions as part of a diagnostics system applied to the gas module. The Hall-effect sensors are very sensitive to change in the distance from the magnets 10, 12. However, the sensors do not impose any force on the shaft 14 and therefore are not a source of effects which has to be taken into account.

The shaft 14 moves endwise ideally along the axis 16, which lies at right angles to the plane of the circle on which the sensors 18–24 are located and which passes through the centre of that circle. However, the axis of motion is, in practice, liable to displacement. Typically, for example, the displacement is angular being equivalent to a tilt, although in general either a tilt or displacement parallel to the ideal position at 16 is taken into account by the design of the transducer.

The magnet 10 consists of a piece of flexible ferrite material available under the type code TPFF00865 from Magnetic Developments Limited of Unit 17, Highworth Industrial Park, Highworth, Swindon, Wiltshire, SN6 7NA, England. Originally, the piece of material was flat and was magnetised so that a south pole was present everywhere at one face and a north pole was present everywhere at the opposite face. These faces were the major faces of the piece and the minor faces were the four edge faces of the piece. The piece of material is very flexible and it was readily bent around the shaft 14 to produce the hollow, cylindrical shape shown at 10. The material is then bonded to the shaft by a suitable adhesive and then covered by a protective sheath e.g. a heat-shrink sheath. Bending of the piece of material was such that a south pole was presented everywhere at the external cylindrical face 50 of the magnet. A north pole was presented everywhere at the internal face 52 of the magnet.

The other magnet 12 was produced from the same material as the magnet 10. However, bending in this case was such that a north pole was presented everywhere at the external cylindrical face 54 of the magnet and a south pole was presented everywhere at the internal face, which is not visible in the drawings.

As the south pole 10 moves downwardly past the array 26 of sensors along the axis 16 the outputs of the sensors, each of which is a voltage, increases in the negative sense to a maximum at the mid-point of the south pole 10 and then decreases in the negative sense to a zero output at the join of the south pole 10 and the north pole 12. As the north pole 10 moves downwardly the output increases in the positive sense to a maximum at the mid-point of the north pole 10 and then decreases back to zero at the top edge of the north pole 12. The net result is an output which has the form of one cycle of a sinusoidal wave.

The voltage outputs of the sensors 18–24 are summed as shown in FIG. 3 by means which in this case is a summing amplifier 60. The amplifier 60 gives a combined output which can be linearised if required. However, in this application the working range of the transducer is the centre part of the sinusoidal wave mentioned above. In that way the output is approximately a linear one proportionately representing travel of the magnets 10, 12.

This combined output is unaffected by rotation of the shaft 14. As the shaft rotates the magnetic field experienced by the sensors 18–24 remains uniform so that no change in total output occurs.

Furthermore, the combined output is unaffected by displacement of the axis 16 sideways or by tilting of the axis 16. As the shaft 14 tilts the magnetic field strength will be increased acting on the sensors it moves closer to and reduced by the same amount on the sensors it moves further from. As a result there will be no change in the total, combined output of the summing amplifier 60.

The output of the sensors 18–24 can be varied by altering the spacing between the sensors and the magnets 10, 12 on the shaft 14. The output from the sensors can also be varied by altering the length, along the axis 16, of magnetic material in the magnets 10, 12. The shaft 16 can be of either ferrous or non-ferrous material.

Although four sensors 18–24 are described above, a different number could be used. Whatever number is used, the sensors will be arranged at points on a circle. Also, they will be equiangularly distributed about the centre of the circle; or else groups of sensors will be equiangularly distributed.

Preferably, there will be an even number of sensors. However, that is not essential. For example, three sensors may be used. The aim is to compensate for tilt or sideways displacement of the axis 16, and also to cater for rotation of the magnets 10, 12, so as to give a combined output under all conditions which is unaffected by tilt, or sideways displacement or rotation of the magnets 10, 12.

Although two magnets 10, 12 are described above, it is possible to use only one magnet. The working range of such a modified transducer would be only half what it is using two magnets.

I claim:

1. A motion transducer comprising magnetised ferromagnetic material which is capable of motion past an array of Hall-effect sensors positioned in a common plane at points on a circle, said motion being along a straight axis transverse to said plane in which said circle lies, said axis being displaceable from a true position normal to said plane through the centre of said circle to a displaced position within said circle, said magnetised material being in the form of a hollow cylinder having a central longitudinal axis coincident with said straight axis, and comprising external and internal faces, and said material being magnetised so that said external face everywhere presents a magnetic pole of a first polarity and said internal face everywhere presents a magnetic pole of a second polarity, each sensor having an output when the magnetised material moves past the sensors and the transducer also comprising means by which said output may be combined with each other said output to yield a combined output representative of said motion, the value of said combined output being unaffected by any rotation of said hollow cylinder of magnetised material about said straight axis either in said true position or in said displaced position, said sensors being located in the array such that each said output is equal to each other said output in response to said motion along said straight axis in said true position and said combined output being unaffected by said motion along said straight axis in said displaced position, any increase in said output from any sensor or sensors closer to said displaced position of said straight axis being compensated for by reduced output from a sensor or sensors more remote from said displaced position of said straight axis, said output having the form of part of a sine wave and said motion being such that said output has a substantially linear relationship with said motion.

2. A transducer according to claim 1, the magnetised material comprising a first hollow cylinder and a second hollow cylinder, each said cylinder having a central longitudinal axis coincident with said straight axis, said cylinders being positioned in contact with one another, said first cylinder comprising a first external face and the first cylinder being magnetised so that said first external face everywhere presents a magnetic pole of a first polarity, said second cylinder comprises a second external face and the second cylinder being magnetised so that said second external face everywhere presents a magnetic pole of a second polarity.

3. A transducer according to claim 1, there being four sensors in said array at points on said circle which points are equiangularly distributed around said circle.

4. A transducer according to claim 1, wherein the magnetised material comprises flexible material.

5. A transducer according to claim 1, wherein the magnetised material is formed around a common shaft.

* * * * *